United States Patent
Herbster et al.

(10) Patent No.: US 7,188,539 B2
(45) Date of Patent: Mar. 13, 2007

(54) TRANSMISSION CONTROL METHOD FOR REPEATED FORWARD-REVERSE OPERATION

(75) Inventors: Kai-Uwe Herbster, Tettnang-Bürgermoos (DE); Martin-Joachim Bader, Wolpertswende (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 197 days.

(21) Appl. No.: 11/110,176

(22) Filed: Apr. 20, 2005

(65) Prior Publication Data

US 2005/0235765 A1    Oct. 27, 2005

(30) Foreign Application Priority Data

Apr. 21, 2004   (DE) .................. 10 2004 019 279

(51) Int. Cl.
*F16H 59/00*   (2006.01)

(52) U.S. Cl. ........................................................ 74/335

(58) Field of Classification Search ................ 475/132; 74/335
See application file for complete search history.

(56) References Cited

U.S. PATENT DOCUMENTS

| | | | |
|---|---|---|---|
| 4,768,636 A | * | 9/1988 | Ito et al. ........................ 477/71 |
| 4,914,983 A | | 4/1990 | Simonyi et al. |
| 6,508,742 B2 | | 1/2003 | Popp et al. |

FOREIGN PATENT DOCUMENTS

| | | |
|---|---|---|
| DE | 100 35 479 A1 | 2/2002 |
| DE | 101 28 853 A1 | 12/2002 |
| DE | 102 47 243 A1 | 4/2003 |

* cited by examiner

*Primary Examiner*—Dirk Wright
(74) *Attorney, Agent, or Firm*—Davis Bujold & Daniels, P.L.L.C.

(57) ABSTRACT

Within the framework of the procedure for optimizing the rocking free of vehicles with an automatic transmission, a multiple clutch gear or an automatic shift gear, in order to recognize a situation which requires a rocking free of the vehicle, the speeds of the driving wheels are compared to the speeds of the non-driven wheels. When the driving wheels are spinning or have a specific speed, without a corresponding increase in speed or speed of the non-driven wheels, the necessity for rocking free of a vehicle is recognized.

4 Claims, 1 Drawing Sheet

TRANSMISSION CONTROL METHOD FOR REPEATED FORWARD-REVERSE OPERATION

This application claims priority from German Application Serial No. 10 2004 019 279.0 filed Apr. 21, 2004.

FIELD OF THE INVENTION

The present invention concerns a procedure for optimizing the rocking free of vehicles with an automatic transmission, a multiple clutch gear, or an automatic shift gear.

BACKGROUND OF THE INVENTION

In vehicles which have stalled due to the low skid number between the driven wheels and the pavement, such as in snow or on a wet lawn or on poor surface, "rocking free of a vehicle" is the long known and proven method to get out from the stuck condition. For example, if a vehicle is stuck in a snowbank, the driver engages the clutch in a manual shift transmission; the vehicle rolls backward out over the lowest point of the snowbank, since no torque is delivered to the wheels any longer. When the driver again puts torque on the driving wheel, the vehicle again moves in the desired driving direction, so that the vehicle is accelerated in the driving direction through the low driving torque and the stored potential energy until it reaches the return point again. At this point, the driver takes the torque from the driving wheels by disengaging the clutch, so that the vehicle again moves against the driving direction. If this procedure is repeated several times, the vehicle is "rocked free" from this snowbank.

From U.S. Pat. No. 4,914,983, it is known for a vehicle with an automatic transmission to activate a mechanism after actuating a switch, in which multiple ND/NR shifting sequences are performed fully automatically in order to free the vehicle from the snowbank. Hereby it is also suggested to introduce semi-automatically alternating ND/NR shifts, in which the time of the engaging of the gear can be controlled directly by the driver via the accelerator.

To reverse the output torque in conventional automatic transmissions, one to be disengaged clutch, actuated by frictional connection, has to be emptied and a second empty clutch, which has to be engaged, has to be filled. Even when the emptying and filling processes of the shifting elements can be performed simultaneously, these generally take between 400 ms–800 ms. These times correspond to a design of the transmission or the transmission control for shifting actions on dry pavements with a maximum in shifting comfort and still acceptable shifting times.

Such long intervals of time or idle time are not suitable for rocking free a vehicle, since the driver does not calculate in or consider the normal delay times for putting the automatic transmissions into gear. As a consequence it may occur that the attempt to free the car by the rocking action is without success, since the new "motor force" is brought about too late. Even if the driver recognizes the idle times of the system and tries to avoid these by prematurely actuating the selector lever, the premature recognition of the optimal point in time for reversing the frictional connection proves to be very difficult.

The present invention is based on the objective to state a procedure for optimizing the rocking free of a vehicle with an automatic transmission, a multiple clutch gear or an automated shift gear, which avoids the disadvantages of the state of the art. In particular, the rocking free of the vehicle shall be supported by an optimization of the shifting times of the shifting elements; in addition, a clear recognition of the need for rocking free the vehicle shall be made possible.

SUMMARY OF THE INVENTION

In case a situation for rocking free of the vehicle is recognized, according to the invention, the frictional connection construction of the shifting elements is accelerated when the gears are put in. This is preferably achieved by a targeted over-filling of the shifting elements, so that the procedure of putting in gears can take place in a distinctly shorter time than in the state of the art. A typical value for this is 100 ms. Advantageously, this over-filling is not felt as a jolt inside the vehicle, since the driven wheels are on a smooth surface anyhow and, therefore, the jolt cannot transfer to the vehicle.

In order to recognize a situation requiring the rocking free of a vehicle, it is suggested to compare the speeds of the driving wheels with the number of revolutions of the non-driven wheels. When the driving wheels spin or have a certain speed without a corresponding increase in speed or a speed of the non-driven wheels, the necessity of rocking free the vehicle is recognized. An especially advantageous further embodiment of the invention provides that the necessity for rocking free a vehicle exists if, concurrently to the discrepancy between the speeds, rapidly alternating torque introductions are performed (i.e., in case of an automatic transmission, a fast RDRD change). Other procedures for recognizing a required rocking free of a vehicle can be utilized. The recognition can thereby be based on measured wheel speeds, speed gradients, torque balances of the sequence of position change shifts or on a combination of these criteria.

According to the invention, the concept allows for a successful and rapid rocking free of the vehicle by way of optimal synchronization of the alternating torque introductions onto the driven wheels. The procedure can be performed in a manual rocking free of the vehicle performed by the driver, as well as be integrated into automatically running procedures.

BRIEF DESCRIPTION OF THE DRAWING

The invention will now be described, by way of example, with reference to the accompanying drawings in which.

DETAILED DESCRIPTION OF THE INVENTION

Figure 1:
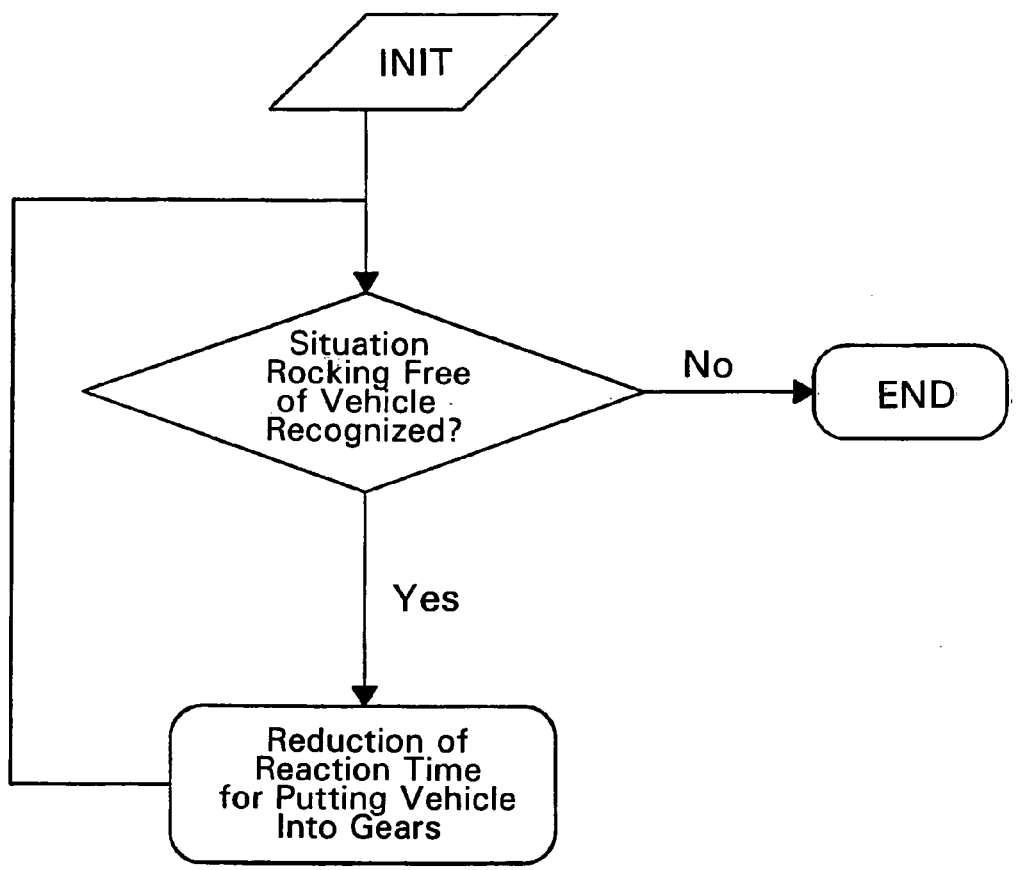
FIG. 1 is a block diagram of the procedure.

After initialization, the speed of the driving wheels and the non-driven wheels are evaluated. If the driving wheels spin without a corresponding increase in speed of the non-driven wheels and, at the same time, rapidly alternating torque introductions are performed, the necessity for rocking free the vehicle is recognized.

Subsequently, the reaction time needed for putting in the gears is shortened by purposefully over-filling the shifting elements, according to the invention; thus the frictional connection construction is significantly accelerated in the shifting element to be engaged.

The invention claimed is:

1. A method for optimizing the rocking free of a vehicle in an automatic transmission, a multiple clutch gear or an automatic shift gear, the method comprising the steps recognizing a situation which requires the rocking free of the vehicle, accelerating the frictional connection construction of the shifting elements when putting in the gears.

2. The method for optimizing the rocking free of a vehicle according to claim 1, further comprising a step of performing a targeted shifting element over-filling of the to be engaged shifting elements.

3. The method for optimizing the rocking free of a vehicle according to claim 1, further comprising a step of comparing a speed of driving wheels to a speed of non-driven wheels, whereby when the driving wheels spin or show a specific speed, without a corresponding increase in spin or specific speed of the non-driven wheels, a necessity for a rocking free of the vehicle is recognized.

4. The method for optimizing the rocking free of a vehicle according to claim 3, further comprising a step of rapidly alternating torque introductions upon recognition of a necessity for rocking free the vehicle, concurrent to the discrepancy between the speed of the driving wheels and the non-driven wheels.

* * * * *